United States Patent
Ratigan et al.

(10) Patent No.: US 11,906,487 B1
(45) Date of Patent: Feb. 20, 2024

(54) APPARATUS AND METHOD FOR ABRASION TESTING

(71) Applicants: Edward Ratigan, Graham, NC (US); Michael Ratigan, Elon, NC (US); Michael Willis, Burlington, NC (US)

(72) Inventors: Edward Ratigan, Graham, NC (US); Michael Ratigan, Elon, NC (US); Michael Willis, Burlington, NC (US)

(73) Assignee: Fjord, Inc., Graham, NC (US)

( * ) Notice: Subject to any disclaimer, the term of this patent is extended or adjusted under 35 U.S.C. 154(b) by 113 days.

(21) Appl. No.: 17/644,408

(22) Filed: Dec. 15, 2021

(51) Int. Cl.
*G01N 3/56* (2006.01)

(52) U.S. Cl.
CPC ....... *G01N 3/56* (2013.01); *G01N 2203/0058* (2013.01)

(58) Field of Classification Search
CPC .................. G01N 3/56; G01N 2203/0058
See application file for complete search history.

(56) References Cited

U.S. PATENT DOCUMENTS

| | | | | | |
|---|---|---|---|---|---|
| 2,582,223 | A | * | 1/1952 | Blackburn | G01N 3/56 73/150 R |
| 3,831,444 | A | * | 8/1974 | Sasaki | G01N 3/08 73/9 |
| 9,341,555 | B2 | * | 5/2016 | Norman | G01N 3/56 |

FOREIGN PATENT DOCUMENTS

| | | | | |
|---|---|---|---|---|
| GB | 382508 A | * | 10/1932 | G01N 3/56 |
| JP | 3000102 B2 | * | 1/2000 | G01N 3/56 |

\* cited by examiner

*Primary Examiner* — Jill E Culler
(74) *Attorney, Agent, or Firm* — Tuggle Duggins P.A.; Blake P. Hurt; Reinier R. Smit

(57) ABSTRACT

An abrasion testing apparatus with a base, a test platform, a pair of angle adjustment wheels disposed on opposite sides of the test platform, a drive wheel, a tension control wheel, and a plurality of idler wheels. The test surface can be raised or lowered and the pair of angle adjustment wheels can be moved toward or away from the test platform to change the angle of contact between a material on the test surface and a material being moved by the drive wheel. The tension control wheel is movable to control the tension of the moving material during the test. A method of testing abrasion resistance involves placing a first material on the test platform and threading a second material around the drive, idler, tension control, and angle adjustment wheels, and in contact with the first material and moving the second material against the first material.

20 Claims, 2 Drawing Sheets

APPARATUS AND METHOD FOR ABRASION TESTING

FIELD OF THE INVENTION

The subject matter disclosed herein pertains to devices and methods for substrate testing, and more particularly pertains to an apparatus and method for testing abrasion resistance in a reproducible and controlled manner, in one preferred embodiment as it relates to abrasion-resistant textile(s).

DESCRIPTION OF THE PRIOR ART AND OBJECTIVES OF THE INVENTION

Many items of commerce need to meet pre-determined abrasion resistance standards in order to be useful for their intended purpose. For example, ropes used for rock climbing, rappelling, and rescue operations are in contact with rocks, edges of buildings and other structures and/or materials that can damage the rope. If the rope lacks the necessary abrasion resistance, the results can be catastrophic. Similarly, materials used for backpacks, slings, luggage, cargo straps, etc. need to have a certain amount of durability against abrasion encountered during normal use and customers for such products often want or need to know that information when making a purchase.

There are known methods and apparatus used to measure abrasion resistance of materials. For example, ASTM International ("ASTM") promulgates standards for, among other things abrasion testing of materials. The standards provide detailed test method steps and a description of the testing apparatus used to conduct the test. However, these tests often suffer from lack of reproducibility. As an example, ASTM D4966 entitled "Standard Test Method for Abrasion Resistance of Textile Fabric (Martindale Abrasion Tester Method)," in Section 5 entitled "Significance and Use", specifically acknowledges that the method is not very reliable or reproducible, even within a given laboratory and this lack of reproducibility is due, in part, to the nature of abrasion testing itself.

There is thus a need for an abrasion testing apparatus and method that eliminates variability inherent in many prior art testing devices and methods and thus improves the overall reliability and reproducibility of the test, and by extension the underlying materials that are tested.

Accordingly, it is an objective of the subject matter contained in the present disclosure to provide an abrasion testing apparatus and method that provides a high degree of control and reproducibility of test conditions.

It is another objective of the present disclosure to provide an abrasion testing apparatus and method having digital control of speed, tension, test duration, and/or angle of contact.

It is a further objective of the present disclosure to provide an abrasion testing apparatus and method in which a moving object is in intimate contact with a stationary material.

It is a yet another objective of the present disclosure to provide an abrasion testing apparatus and method having pneumatically controlled tension adjustment.

It is still a further objective of the present disclosure to provide an abrasion testing apparatus and method in which the angle of contact of a moving object against a stationary material can be varied by manual and/or automated manipulation.

It is still another objective of the present disclosure to provide an abrasion testing apparatus and method in which a moving object is in intimate contact with a stationary material, with the flexibility to test the abrasion resistance of the moving object or the stationary material.

Various other objectives and advantages of the present disclosure will become apparent to those skilled in the art as a more detailed description is set forth below.

SUMMARY OF THE INVENTION

An abrasion testing apparatus as disclosed herein includes a base, a test surface, a plurality of angle adjustment wheels disposed on opposing sides of the test surface, a drive wheel, a tension control wheel, and a plurality of idler wheels. The test surface is configured to be raised or lowered relative to the base, and the pair of angle adjustment wheels may be moved toward or away from the test surface. The speed at which the drive wheel rotates is controllable, and may be adjusted by the user. The tension control wheel is also adjustable, while the idler wheels are stationary.

An abrasion testing apparatus and method as disclosed herein may be used to test the abrasion resistance of a moving object against a stationary surface or substrate or test the abrasion of a stationary material or substrate against a moving object. In general, the apparatus and method of the disclosure may be used with any combination of moving material and stationary substrate, with either the moving material or the stationary substrate being the object of the test. Thus, the apparatus and method, for example, may be used to test the abrasion resistance of ropes, ribbons, fibers, or similar materials against a stationary surface to simulate in-use conditions. Similarly, the apparatus and method may be used, for example, to test the resistance of a substrate, cloth, textile, or other similar material against abrasion from an in-motion material.

The method of testing the abrasion resistance of a test material includes the steps of placing a first material on the stationary test platform of the abrasion testing apparatus described above and threading a loop of a second material around the wheels of the testing apparatus with the second material in intimate contact with the first material, adjusting the position of the test surface and/or the angle adjustment wheels to obtain a pre-determined contact angle between the first material and the second material; adjusting the tension control wheel to obtain a pre-determined amount of tension on the second material, and actuating the drive wheel and adjusting the speed thereof to obtain a pre-determined speed of the loop of the second material.

DETAILED DESCRIPTION OF THE PREFERRED EMBODIMENT AND OPERATION OF THE INVENTION

Figure 1:
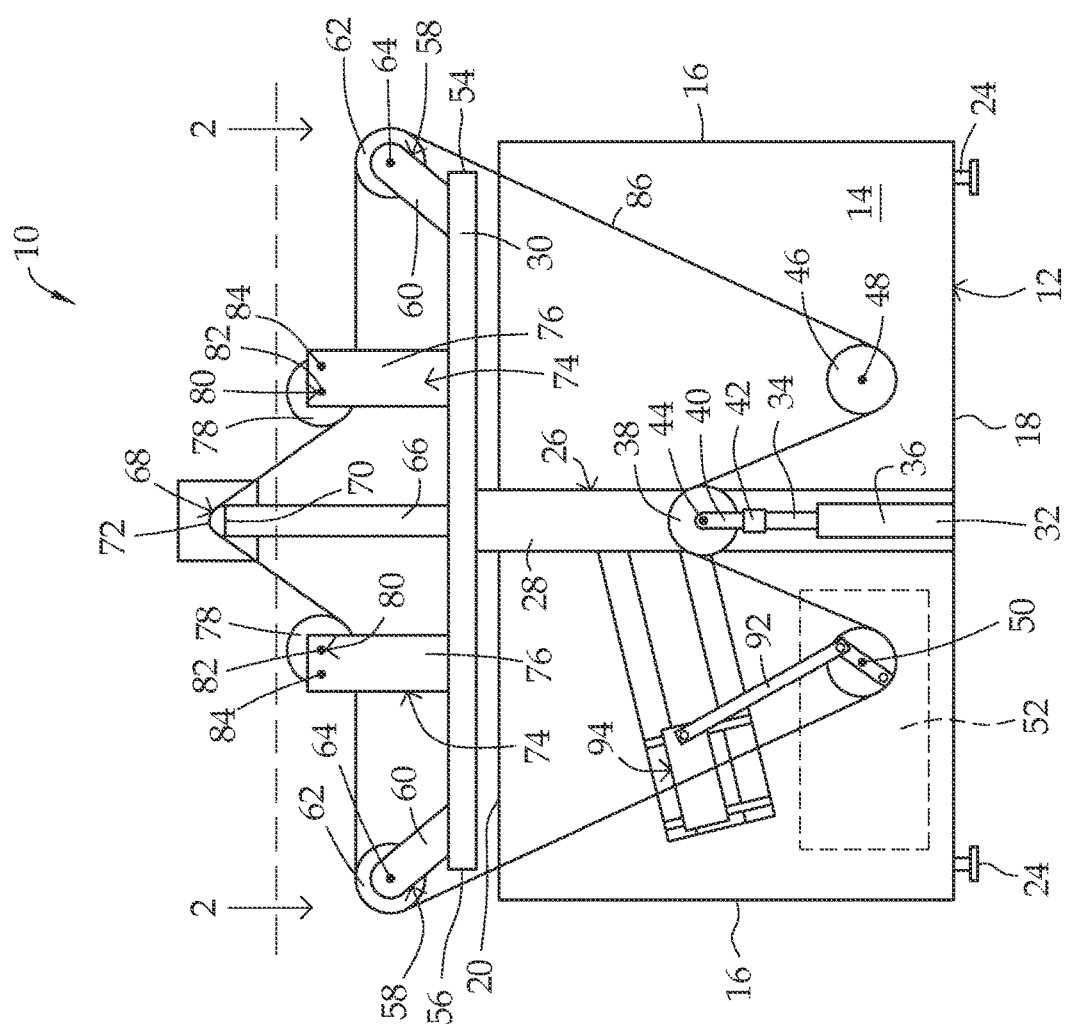
FIG. 1 is a front elevational view of an embodiment of the abrasion testing apparatus.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items, but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Figure 2:
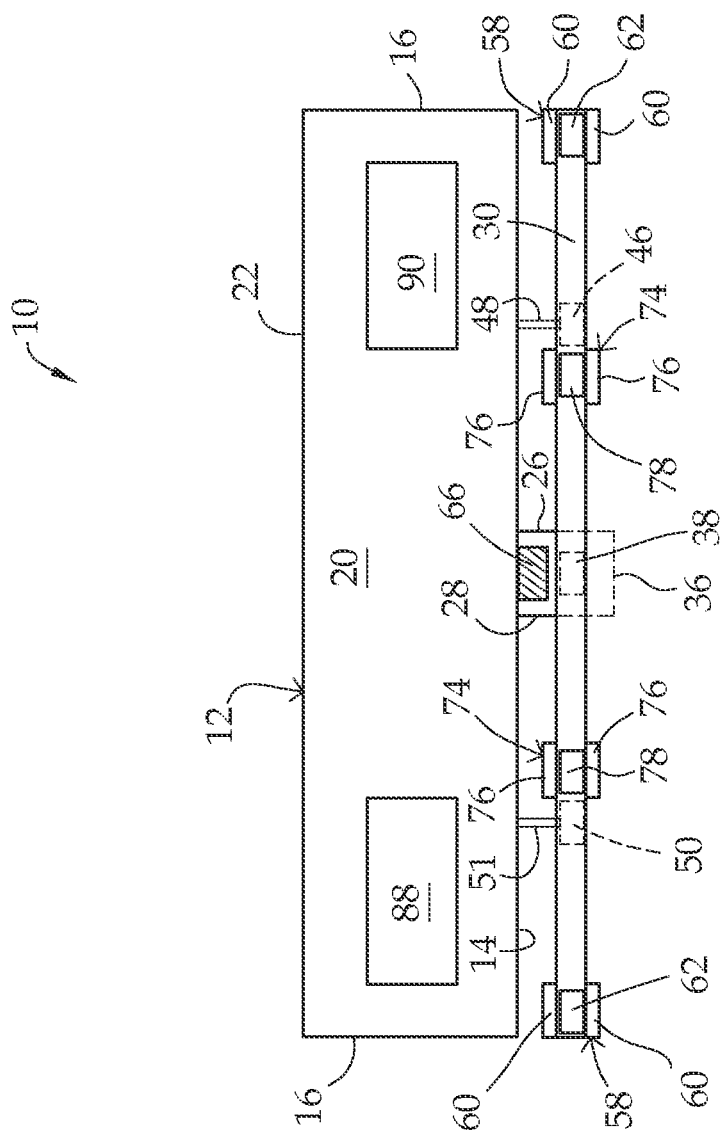
FIG. 2 is a partially sectioned, and partially in phantom, top plan view of the abrasion testing apparatus of FIG. 1, as seen along lines 2-2.

For a better understanding of the disclosure and its operation, and with reference being made first to FIG. 1, an embodiment of the abrasion testing apparatus 10 is illustrated in a side elevational view. In the depicted embodiment, the abrasion testing apparatus 10 includes a base 12. The base 12 has a box-like construction with a front surface 14, side surfaces 16, 16, a bottom surface 18, and a top surface 20. While not particularly necessary, the base 12 may also have a back surface 22 as shown in FIG. 2. It is desired to have at least a partial back surface to provide rigidity and stability to the base during operation of the testing apparatus, but unless otherwise indicated the geometry of base 12 is not intended to be construed as a limitation of the instant disclosure. Leaving the back of the base 12 at least partially open may facilitate access to the components within the base 12.

The bottom surface 18 of base 12 may include one or more feet 24. The one or more feet 24 are preferably adjustable, so that base 12 can accommodate uneven floor surfaces. Wheels (not shown) may also be added to the base 12 to facilitate movement of the testing apparatus 10 if desired. A T-shaped bracket 26 is preferably affixed to the front surface 14 of the base 12. The preferred T-shaped bracket 26 defines a vertical section 28 and a horizontal section 30. Attached to the vertical section 28 of the bracket 26 is a pneumatic cylinder 32. The pneumatic cylinder 32 has a piston 34 that extends and retracts relative to the cylinder housing 36. A tension control wheel 38 may be affixed within a bracket 40 at a terminal end 42 of the piston 34. The tension control wheel 38 rotates about an axle 44.

In the preferred embodiment of testing apparatus 10, an idler wheel 46 is attached to the front surface 14 of the base 12 and is laterally spaced from the vertical section 28 of the bracket 26. The idler wheel 46 is configured to rotate about an axle 48, which may be attached to the front surface 14 of the base 12. A drive wheel 50 is operatively connected by an axle 51 to a drive motor 52 and projects out of the front surface 14 of the base 12. The drive wheel 50 is laterally spaced from the vertical section 28 of the T-shaped bracket 26. The drive wheel 50 and the idler wheel 46 are about equally spaced laterally from and on opposite sides of the vertical section 28 of the T-shaped bracket 26. The horizontal section 30 of the T-shaped bracket 26 is preferably a longitudinal member having opposite terminal ends 54, 56 which each include a wing bracket 58, 58. The wing brackets 58, 58 may define two spaced-apart arms 60 (seen at least in FIG. 2). An idler wheel 62 is mounted between the spaced-apart arms 60 of the wing brackets 58 for rotation about axles 64, 64.

A vertical shaft 66 is positioned at the center of the horizontal section 30 of the T-shaped bracket 26 and aligned with the vertical section 28 of the T-shaped bracket 26. The vertical shaft 66 is operable to selectively retract and extend relative to the top surface 20 of the base 12 as may be desirable. In some embodiments, the vertical shaft 66 is telescopically mounted within the vertical section 28 of the T-shaped bracket 26. The raising and lowering of the vertical shaft 66 may be accomplished by any suitable device, such as a pneumatic or electronically controlled motor, pump, or the like.

A test platform 68 is preferably affixed to a terminal end 70 of the vertical shaft 66. In the embodiment shown, the test platform 68 has a convex outer surface 72. A convex outer surface is particularly useful in testing abrasion resistance of textiles, ropes, fibers, ribbons and similar materials. Other surface shapes for the test platform may be used for particular test applications as may be desirable by the user. The center of the test platform 68 is preferably vertically aligned with the tension wheel 38 (FIG. 2) along a central midline of apparatus 10.

A plurality of angle adjustment brackets 74, 74 are preferably located on the horizontal section 30 of the T-shaped bracket 26, with at least one of the brackets 74 being located on either side of the vertical shaft 66 and spaced between the vertical shaft 66 and the respective one of the pair of wing brackets 58. The angle adjustment brackets 74 each preferably include a pair of upright arms 76, 76 (see FIG. 2) that are spaced-apart from one another. An angle adjustment wheel 78 is located between the spaced-apart upright arms 76, 76 and mounted on an axle 80, 80, for rotational movement. The upright arms 76, 76 are preferably provided with multiple through holes 82, 84 to enable repositioning of the axle 80. Having multiple rotation points for the angle adjustment wheels 78, 78 provides a greater degree of adjustment to that angle at which a material, such as rope 86, contacts the test platform 68, and thus may be desirable to the user in circumstances.

It may be preferable to minimize abrasion on the test material any locations other than at the test platform 68. Accordingly, it is preferable that the test platform 68 be oriented approximately (i.e. +/−5 degrees) in the same vertical plane (i.e. as measured laterally relative to apparatus 10) as the angle adjustment wheels 78, 78, the upper idler wheels 62, 62, the lower idler wheel 46, the tension control wheel 38, and the drive wheel 50. By aligning these components in the same vertical plane, the tendency of the test material to slide off one of the wheels, or "skate" off the wheel surface is minimized. For the same reason, it is advantageous that the surface of the wheels have a surface configuration that mates with the shape of the test material. For example, when testing a rope, which has a circular cross-sectional shape, it is preferable for the wheels to have a central convex groove. When testing a ribbon, it might be preferable for the wheels to have a flat central trough or channel. By having a mating configuration, the track of the test material over the surface of the wheels can be better controlled with less undesired rubbing or abrasion; provided however that the specific geometry of the wheel surface configuration not be considered a limitation on the scope of the instant disclosure.

With particular reference to FIG. 2, the abrasion testing apparatus 10 is shown in a top plan view as viewed along lines 2-2 of FIG. 1, with the vertical shaft 66 shown in section. The drive wheel 50, tension control wheel 38, housing 36 of pneumatic cylinder 32, and idler wheel 46 are shown in phantom as they are located directly below the horizontal section 30 of T-shaped bracket 26, so as to keep the various wheels in the same vertical plane as noted above. Mounted on the top surface 20 of the base 12 are instrument panels 88, 90. These instrument panels may be control panels containing input adjustments to control variables such as speed, contact angle, tension, duration, etc. for the test, or they may be readout panels containing real time data to monitor the test. Combination panels, containing both an input control and readout are also contemplated. While shown as two separate panels, instrument panels 88, 90 may in practice be one or more panels used to control and monitor process variables. Likewise, while the embodiments show the instrument panels 88, 90 mounted on the top surface 20 of the base 12, it is understood that the panels may be mounted anywhere on the base 12 that is desired and may even be used remote from the base 12 and operatively connected to the pneumatic cylinder 32, drive motor 52, or other components of the testing apparatus 10 by any suitable connections.

It may be apparent to those skilled in the art that the test platform 68 may be equipped with various sensors or other devices to detect wear, speed, pressure, or other parameter relevant to the test. Data from these sensors may be used to control test variables in real time, such as by adjusting the position of the tension control wheel 38 in response to detected wear so that constant pressure is applied at the test platform throughout the duration of the test. Another example might be to use a visual sensor to identify the location of the endless loop of material relative to the center of the wheels and use that data to automatically cant the angle of one or more wheels to adjust the "tracking" of the material relative to the center of the wheels and thus minimize undesired abrasion. FIG. 2 also illustrates the spaced-apart arms 60, 60 of the wing brackets 58, the spaced-apart arms 76, 76 of the angle adjustment brackets 74 and the respective mounting of the upper idler wheels 62 and the angle adjustment wheels 78 therein. For clarity, the rope 86 shown in FIG. 1 has been omitted from FIG. 2.

The process of testing the abrasion resistance of a material will be described. Generally the first step in the process is to place a piece of a first material on the surface of the test platform 68, then place a portion, and preferably an endless loop, of a second material in intimate contact with the first material, and thread the loop of the second material under the angle adjustment wheels 78, 78, then over the upper idler wheels 62, 62, around lower idler wheel 46, over tension control wheel 38, and under drive wheel 50, as seen in FIG. 1. If necessary, the location of the angle adjustment wheels 78, 78 may be moved to different through holes 82, 84 to reach the desired angle between the first material on the test platform 68 and the endless loop of the second material. The pneumatic cylinder 36 would then be actuated to move the tension control wheel 38 into position to provide the desired amount of tension on the endless loop of second material and maintain intimate contact between the first material on the test platform 68 and the loop of second material; or in the alternative, in a "back and forth" manner via reciprocating bar 92 and sliding assembly 94. The drive motor 52 would then be activated to rotate the drive wheel 50 and move the loop of second material at a desired speed. The process would continue, with or without automated or manual adjustment, until a desired end point was reached, which might be duration, material failure, distance, temperature, etc. As would be understood, the process describe above may preferably include one or more input sensors, whether digital, electronic, or both, such as, but not limited to, a temperature sensor, a timer, an optical sensor, a distance calculator, a pressure sensor, or the like.

A particularly useful feature of the abrasion testing apparatus and method is the adaptability to use either the first material, which is stationary on the test platform, or the second material, which is moving across the test platform, as the material of interest in the test. Generally speaking, testing of abrasion resistance involves a test material and an abrasive substrate. Thus, the abrasion resistance of a rope may be tested by using the length of rope as an endless loop for the second material, and a sheet of abrasive material to simulate a rock surface or other surface as the first material on the test platform. Alternately, the abrasion resistance of a substrate, such as a textile fabric used for luggage, can be measured by using the textile fabric as the first material on the test platform and using an abrasive material, such as a wire cable, at the endless loop of the second material that is in motion against the textile fabric.

The illustrations and examples provided herein as well as the referenced figures are for explanatory purposes and are not intended to limit the scope of the appended claims.

We claim:

1. An abrasion testing apparatus comprises: a base, a test platform connected to a shaft, wherein the shaft is supported by the base, and the shaft is adjustable between a first position and a second position relative to the base; a pair of angle adjustment wheels each rotatably mounted to a respective first axle, wherein each respective first axle is supported by the base, each angle adjustment wheel being laterally displaced from the test platform; a pair of upper idler wheels each rotatably mounted to a respective second axle, wherein each respective second axle is supported by the base, each upper idler wheel being laterally displaced from the test platform and adjacent one of the pair of angle adjustment wheels; a lower idler wheel rotatably mounted to a third axle, wherein the third axle is supported by the base, a tension control wheel rotatably mounted to a fourth axle, wherein the tension control wheel is adjustable between a first position and a second position relative to the base, and a drive wheel operatively connected to a drive motor.

2. The abrasion testing apparatus of claim 1, wherein the base has a box-like construction with a front surface, opposing side surfaces, a bottom surface, a top surface and at least a partial back surface.

3. The abrasion testing apparatus of claim 1, further comprising a T-shaped bracket mounted to a front surface on said base; the T-shaped bracket having a vertical section and a horizontal section; said horizontal section disposed above a top surface of the base.

4. The abrasion testing apparatus of claim 1, further comprising a T-shaped bracket mounted to the base; the T-shaped bracket having a vertical section and a horizontal section; said horizontal section further comprising a pair of wing brackets located at opposite terminal ends of said horizontal section; wherein a respective one of said upper idler wheels is rotationally mounted within a respective one of said wing brackets.

5. The abrasion testing apparatus of claim 1, further comprising a T-shaped bracket mounted to the base; the T-shaped bracket having a vertical section and a horizontal section; said horizontal section further comprising a pair of wing brackets located at opposite terminal ends of said horizontal section; said wing brackets each comprising a pair of spaced-apart arms; wherein a respective one of said upper idler wheels is rotationally mounted within a respective one of said wing brackets on the third axle that traverses the spaced-apart arms.

6. The abrasion testing apparatus of claim 1, further comprising a T-shaped bracket mounted to the base; the T-shaped bracket having a vertical section and a horizontal section; wherein said test platform is attached to a terminal end of the shaft; said shaft being vertically aligned with the vertical section of said T-shaped bracket; and wherein said shaft is telescopically mounted within the vertical section of the T-shaped bracket.

7. The abrasion testing apparatus of claim 1, further comprising a T-shaped bracket mounted to the base; the T-shaped bracket having a vertical section and a horizontal section; said horizontal section further comprising a pair of wing brackets located at opposite terminal ends of said horizontal section; said wing brackets each comprising a pair of spaced-apart arms; wherein a respective one of said upper idler wheels is rotationally mounted within a respective one of said wing brackets on the third axle that traverses the spaced-apart arms; wherein said test platform is attached to a terminal end of the shaft; said shaft being vertically aligned with the vertical section of said T-shaped bracket; and wherein said shaft is telescopically mounted within the vertical section of the T-shaped bracket.

8. The abrasion testing apparatus of claim 1, further comprising a T-shaped bracket mounted to a front surface on said base; the T-shaped bracket having a vertical section and a horizontal section; said horizontal section disposed above a top surface of the base; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets.

9. The abrasion testing apparatus of claim 1, further comprising a T-shaped bracket mounted to a front surface on said base; the T-shaped bracket having a vertical section and a horizontal section; said horizontal section disposed above a top surface of the base; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets; wherein said angle adjustment brackets each comprise a pair of spaced-apart arms and wherein a respective one of the angle adjustment wheels is rotationally mounted on the first axle that traverses the pair of spaced-apart arms.

10. The abrasion testing apparatus of claim 1, further comprising a T-shaped bracket mounted to a front surface on said base; the T-shaped bracket having a vertical section and a horizontal section; said horizontal section disposed above a top surface of the base; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets; wherein said angle adjustment brackets each comprise a pair of spaced-apart arms and wherein a respective one of the angle adjustment wheels is rotationally mounted on the first axle that traverses the pair of spaced-apart arms; wherein said test platform is attached to a terminal end of the shaft; said shaft being vertically aligned with the vertical section of said T-shaped bracket; and wherein said shaft is telescopically mounted within the vertical section of the T-shaped bracket.

11. The abrasion testing apparatus of claim 1, further comprising a T-shaped bracket mounted to a front surface on said base; the T-shaped bracket having a vertical section and a horizontal section; said horizontal section disposed above a top surface of the base; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets; wherein said test platform is attached to a terminal end of the shaft; said shaft being vertically aligned with the vertical section of said T-shaped bracket; and wherein said shaft is telescopically mounted within the vertical section of the T-shaped bracket.

12. The abrasion testing apparatus of claim 1, further comprising a T-shaped bracket mounted to the base; the T-shaped bracket having a vertical section and a horizontal section; wherein said test platform is attached to a terminal end of the shaft; said shaft being vertically aligned with the vertical section of said T-shaped bracket; and wherein said shaft is vertically adjustable relative to the horizontal section of the T-shaped bracket; said horizontal section further comprising a pair of wing brackets located at opposite terminal ends of said horizontal section; wherein a respective one of said upper idler wheels is rotationally mounted within a respective one of said wing brackets; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets.

13. The abrasion testing apparatus of claim 1, further comprising a T-shaped bracket mounted to a front surface on said base; the T-shaped bracket having a vertical section and a horizontal section; wherein a pneumatic cylinder is affixed to the horizontal section of the T-shaped bracket and wherein the tension control wheel is operatively connected to the pneumatic cylinder.

14. The abrasion testing apparatus of claim 1, further comprising a T-shaped bracket mounted to a front surface on said base; the T-shaped bracket having a vertical section and a horizontal section; wherein a pneumatic cylinder is affixed to the horizontal section of the T-shaped bracket; wherein the tension control wheel is operatively connected to the pneumatic cylinder; and wherein said test platform is attached to a terminal end of the shaft; said shaft being vertically aligned with the vertical section of said T-shaped bracket; and wherein said shaft is telescopically mounted within the vertical section of the T-shaped bracket.

15. The abrasion testing apparatus of claim 1, further comprising a T-shaped bracket mounted to a front surface on said base; the T-shaped bracket having a vertical section and a horizontal section; wherein a pneumatic cylinder is affixed to the horizontal section of the T-shaped bracket and wherein the tension control wheel is operatively connected to the pneumatic cylinder; said horizontal section further comprising a pair of wing brackets located at opposite terminal ends of said horizontal section; wherein a respective one of said upper idler wheels is rotationally mounted within a respective one of said wing brackets.

16. The abrasion testing apparatus of claim 1, further comprising a T-shaped bracket mounted to a front surface on said base; the T-shaped bracket having a vertical section and a horizontal section; wherein a pneumatic cylinder is affixed to the horizontal section of the T-shaped bracket and wherein the tension control wheel is operatively connected to the pneumatic cylinder; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets.

17. The abrasion testing apparatus of claim 1, further comprising a T-shaped bracket mounted to a front surface on said base; the T-shaped bracket having a vertical section and a horizontal section; wherein a pneumatic cylinder is affixed to the horizontal section of the T-shaped bracket and wherein the tension control wheel is operatively connected to the pneumatic cylinder; said horizontal section further comprising a pair of wing brackets located at opposite terminal ends of said horizontal section; wherein a respective one of said upper idler wheels is rotationally mounted within a respective one of said wing brackets; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets.

18. The abrasion testing apparatus of claim 1, further comprising a T-shaped bracket mounted to a front surface on said base; the T-shaped bracket having a vertical section and a horizontal section; wherein a pneumatic cylinder is affixed to the horizontal section of the T-shaped bracket and wherein the tension control wheel is operatively connected to the pneumatic cylinder; said horizontal section further comprising a pair of wing brackets located at opposite terminal ends of said horizontal section; wherein a respective one of said upper idler wheels is rotationally mounted within a respective one of said wing brackets; said horizontal section further comprising a pair of angle adjustment brackets, each of said angle adjustment brackets being laterally displaced relative to the vertical section of said T-shaped bracket; wherein a respective one of the angle adjustment wheels is rotationally mounted within a respective one of the angle adjustment brackets; and wherein said test platform is attached to a terminal end of the shaft; said shaft being vertically aligned with the vertical section of said T-shaped bracket; and wherein said shaft is telescopically mounted within the vertical section of the T-shaped bracket.

19. The abrasion testing apparatus of claim 1, wherein the test platform, the angle adjustment wheels, the upper idler wheels, the lower idler wheel, the tension control wheel, and the drive wheel are all aligned within a common vertical plane.

20. A method of testing abrasion resistance comprising the steps of: placing a first material and a portion of a second material on an abrasion testing apparatus; said abrasion testing apparatus comprising a base, a test platform; a pair of angle adjustment wheels, each angle adjustment wheel being laterally displaced from the test platform; a pair of upper idler wheels, each upper idler wheel being laterally displaced from an adjacent one of the pair of angle adjustment wheels; a lower idler wheel, a tension control wheel, and a drive wheel; wherein the test platform is vertically adjustable and wherein the tension control wheel is vertically adjustable; the method further comprising the steps of placing the first material on the test platform, placing the portion of second material in intimate contact with the first material, threading the portion of second material under the angle adjustment wheels, over the upper idler wheels, under the drive wheel and lower idler wheel, and over the tension control wheel; adjusting the test platform and/or the angle adjustment wheels to obtain a pre-determined angle between the first material and the portion of the second material; adjusting the tension control wheel to obtain a pre-determined tension in the portion of the second material; and activating the drive wheel to move the portion of the second material against the first material.

* * * * *